(12) United States Patent
Han

(10) Patent No.: US 8,925,662 B2
(45) Date of Patent: Jan. 6, 2015

(54) IN-WHEEL DRIVING DEVICE

(71) Applicant: Samsung Techwin Co., Ltd., Changwon (KR)

(72) Inventor: Kyung-Won Han, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 13/921,693

(22) Filed: Jun. 19, 2013

(65) Prior Publication Data

US 2014/0028081 A1    Jan. 30, 2014

(30) Foreign Application Priority Data

Jul. 26, 2012    (KR) .................. 10-2012-0081963

(51) Int. Cl.
*B60K 7/00* (2006.01)
*B60K 17/04* (2006.01)

(52) U.S. Cl.
CPC .............. *B60K 7/0007* (2013.01); *B60K 17/043* (2013.01); *B60K 7/00* (2013.01); *B60K 2007/0038* (2013.01); *B60K 2007/0092* (2013.01)
USPC .......... 180/65.51; 180/65.6; 310/89; 301/137

(58) Field of Classification Search
CPC .................. B60K 7/00; B60K 7/0007; B60K 2007/0038; B60K 2007/0092; B60K 17/043; B60K 17/046
USPC .......... 180/65.51, 65.56; 310/89, 67 A, 75 D, 310/90; 301/13.1, 137
See application file for complete search history.

(56) References Cited

U.S. PATENT DOCUMENTS

| | | | | |
|---|---|---|---|---|
| 2,581,551 | A * | 1/1952 | Myrmirides | 310/67 R |
| 2,949,040 | A * | 8/1960 | Bixby | 74/390 |
| 4,913,258 | A * | 4/1990 | Sakurai et al. | 180/242 |
| 5,255,874 | A * | 10/1993 | Roussel | 244/103 R |
| 6,592,486 | B1 * | 7/2003 | Arbanas et al. | 475/84 |
| 7,105,965 | B2 * | 9/2006 | Mantovani | 310/75 C |
| 7,119,468 | B2 * | 10/2006 | Shkondin | 310/114 |
| 7,950,484 | B2 * | 5/2011 | Moriguchi et al. | 180/65.51 |
| 2003/0217878 | A1 * | 11/2003 | Etzioni et al. | 180/65.5 |
| 2006/0087182 | A1 | 4/2006 | Sugiyama | |
| 2008/0070736 | A1 * | 3/2008 | Yoshino et al. | 475/149 |
| 2008/0257620 | A1 * | 10/2008 | Poulsen | 180/65.2 |
| 2009/0025991 | A1 | 1/2009 | Moriguchi et al. | |
| 2009/0032321 | A1 * | 2/2009 | Marsh et al. | 180/65.51 |
| 2010/0138127 | A1 * | 6/2010 | Boughtwood | 701/71 |
| 2010/0163319 | A1 | 7/2010 | Murata et al. | |
| 2010/0187954 | A1 * | 7/2010 | Kendall et al. | 310/67 R |

(Continued)

FOREIGN PATENT DOCUMENTS

| | | |
|---|---|---|
| JP | 2007-253686 A | 10/2007 |
| JP | 2007-261342 A | 10/2007 |

(Continued)

*Primary Examiner* — Jeffrey J Restifo
*Assistant Examiner* — Steve Clemmons
(74) *Attorney, Agent, or Firm* — Sughrue Mion, PLLC

(57) ABSTRACT

An in-wheel driving device disposed in a car wheel includes a motor including a stator and a rotor; a transmission unit disposed adjacent to the motor, having an opening therein, and configured to receive rotation power from the rotor and rotate the car wheel; and a rigid shaft inserted into the opening to fix the motor to a car body.

16 Claims, 2 Drawing Sheets

(56) References Cited

U.S. PATENT DOCUMENTS

| | | | |
|---|---|---|---|
| 2010/0300782 A1* | 12/2010 | Walter et al. | 180/65.51 |
| 2011/0082000 A1 | 4/2011 | Makino | |
| 2011/0139523 A1* | 6/2011 | Chen | 180/65.51 |
| 2011/0168465 A1* | 7/2011 | Starr | 180/65.51 |
| 2011/0168466 A1* | 7/2011 | Starr | 180/65.51 |
| 2011/0303471 A1* | 12/2011 | Urabe et al. | 180/65.51 |
| 2012/0161497 A1* | 6/2012 | He et al. | 301/6.5 |
| 2012/0168239 A1* | 7/2012 | Gardes et al. | 180/65.51 |
| 2013/0009450 A1* | 1/2013 | Suzuki et al. | 301/6.5 |
| 2013/0056580 A1* | 3/2013 | Gilleran et al. | 244/50 |
| 2013/0134839 A1* | 5/2013 | Boughtwood | 310/67 R |

FOREIGN PATENT DOCUMENTS

| | | |
|---|---|---|
| JP | 2007-313981 A | 12/2007 |
| JP | 2008-24148 A | 2/2008 |
| JP | 2009-90923 A | 4/2009 |
| KR | 10-2009-0057652 A | 6/2009 |

\* cited by examiner

IN-WHEEL DRIVING DEVICE

CROSS-REFERENCE TO RELATED PATENT APPLICATION

This application claims priority from Korean Patent Application No. 10-2012-0081963 filed on Jul. 26, 2012, in the Korean Intellectual Property Office, the disclosure of which is incorporated herein by reference in its entirety.

BACKGROUND

1. Field

Apparatuses consistent with exemplary embodiments relate to an in-wheel driving device, and more particularly, to an in-wheel driving device providing easy access for repairing a motor therein.

2. Description of the Related Art

Hybrid cars, fuel cell cars, and electric cars have been developed to replace general cars operating on gasoline or diesel fuel. The hybrid cars use power generated by an internal combustion engine as well as power generated by an electric motor, whereas the electric cars use only power generated by an electric motor driven by electrical energy produced by a battery, and the fuel cell cars use only power generated by an electric motor driven by electrical energy generated from hydrogen.

An in-wheel system is a system wherein driving power of each wheel of a car is directly controlled via an electric motor that is provided in the wheel, instead of using a conventional internal combustion engine or the like that is provided in the car. Such in-wheel system is used in cars using an electric motor as a driving source of a wheel, such as hybrid cars, fuel cell cars, and electric cars. Specifically, the in-wheel system may be manufactured in a form of an in-wheel driving device.

Due to use of an in-wheel driving device, a car design method and an assembly line must be changed. In other words, when the in-wheel driving device is employed, the shapes and functions of not only an engine room but also parts around the engine, such as sub-frames supporting the engine and a car body, may be largely changed. Also, an in-wheel module to be provided in the wheel may be modified to have an output required by a consumer via demonstration on a car sub-assembly line. Accordingly, an engine driving system that is a core technology of a car may be manufactured separately from the car and assembled on the car through the in-wheel module. Thus, from the car manufacturers' perspective, the development costs may be reduced and development risks may be distributed by cooperating with part suppliers based on overall car target performance and a design of cars.

In-wheel driving devices of various structures have been disclosed. For example, in-wheel driving devices are disclosed in JP 2007-253686 (title of the invention: In-wheel Motor Structure, Applicant: Mitsubishi Motors Corp) or KR 2009-0057652 (title of the invention: In-wheel Type Driving Device, Applicant: Samsung Techwin Co., Ltd).

In an in-wheel driving device of the related art, a decelerator and a motor are provided inside a wheel, and the motor is provided between the decelerator and the car. Accordingly, when the motor breaks down, the whole in-wheel driving device should be separated from the car or the decelerator should be separated from the car in order to replace or repair the motor. Thus, there is a need for an in-wheel driving device that allows easy access to a motor therein to repair or replace it.

SUMMARY

One or more embodiments of the present invention provide an in-wheel driving device having improved accessibility for repairing or replacing a motor inside a wheel.

According to an aspect of an exemplary embodiment, there is provided an in-wheel driving device, the in-wheel driving device being mounted in a car wheel and including: a motor comprising a stator and a rotor; a transmission unit disposed adjacent to the motor, having an opening therein, and configured to receive rotation power from the rotor and rotate the car wheel; and a rigid shaft inserted into the opening to fix the motor to a car body.

The rigid shaft may penetrate through the rotor.

The in-wheel driving device may further include a bearing disposed between the rigid shaft and the rotor.

The motor may include a housing, wherein the rigid shaft may be connected to the housing, the stator may be provided on an inner surface of the housing, and the rotor may be disposed in the housing at a predetermined distance from the stator.

The housing may be integrally formed with the rigid shaft by extending from the rigid shaft.

The housing may include: a housing body unit extending from the rigid shaft and having a repair hole in an outer surface thereof, wherein the stator may be fixed on an inner surface of the housing body unit and the rotor may be disposed in the housing body unit at a predetermined distance from the stator; and a housing cover detachably provided to the housing body unit to open or close the repair hole.

The rigid shaft may have a hollow.

The car wheel may include: a wheel body unit including: an inner space where the transmission unit and the rigid shaft are disposed, and an outer surface whereon a tire is provided; and an outer cover detachably provided to the wheel body unit to open or close a first side of the wheel body unit.

The wheel body unit may have an inner cover detachably provided to the wheel body unit to open or close a second side opposite to the first side.

The in-wheel driving device may further include a spindle disposed inside the car wheel, wherein the spindle is inserted into the rigid shaft.

A part of the transmission unit may be inserted into and fixed to the spindle.

The spindle and the housing may be integrally formed.

The transmission unit may include: a rotating unit connected to the rotor to transmit rotation power of the rotor; and a rotation transmitting unit configured to rotate by contacting the rotating unit and transmit rotation power to the car wheel by reducing a rotation speed of the rotating unit.

The in-wheel driving device may further include a brake unit connected to the transmission unit to adjust a rotation speed of the transmission unit.

The brake unit may include: a disk unit configured to rotate by being connected to a part of the transmission unit; and a pad unit provided in a car and configured to reduce a rotation speed of the disk unit by contacting the disk unit.

The transmission unit may include: a rotating unit configured to rotate by being connected to a part of the transmission unit; and a brake unit provided in a car and configured to reduce a rotation speed of the rotating unit by contacting the rotating unit according to a hydraulic pressure.

BRIEF DESCRIPTION OF THE DRAWINGS

The above and/or other features and advantages will become more apparent by describing in detail exemplary embodiments thereof with reference to the attached drawings in which.

DETAILED DESCRIPTION

Figure 1:
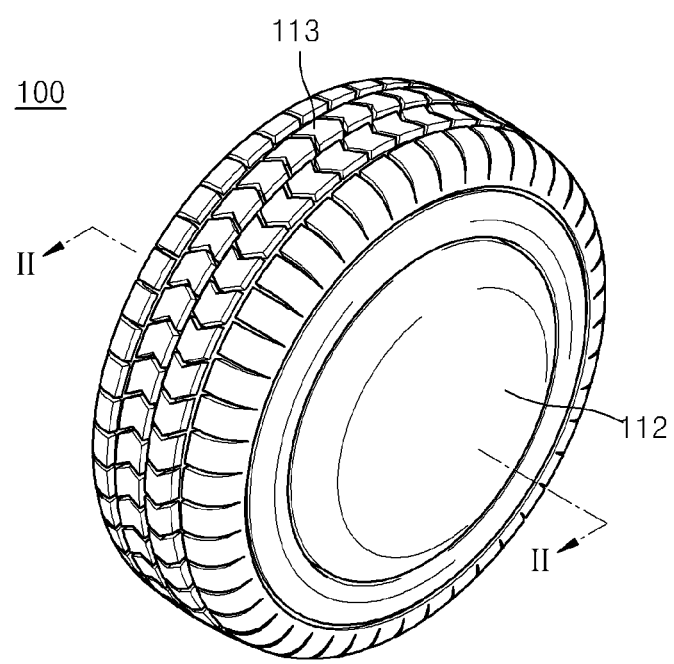
FIG. 1 is a perspective view of an in-wheel driving device according to an exemplary embodiment.

Reference will now be made in detail to exemplary embodiments, examples of which are illustrated in the accompanying drawings, wherein like reference numerals refer to like elements throughout. Inventive concepts may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that, although the terms first, second, third, etc., may be used herein to describe various elements, but these elements should not be limited by these terms. These terms are only used to distinguish one element from another element. As used herein, the term "and/or" includes any and all combinations of one or more of the associated listed items.

Figure 2:
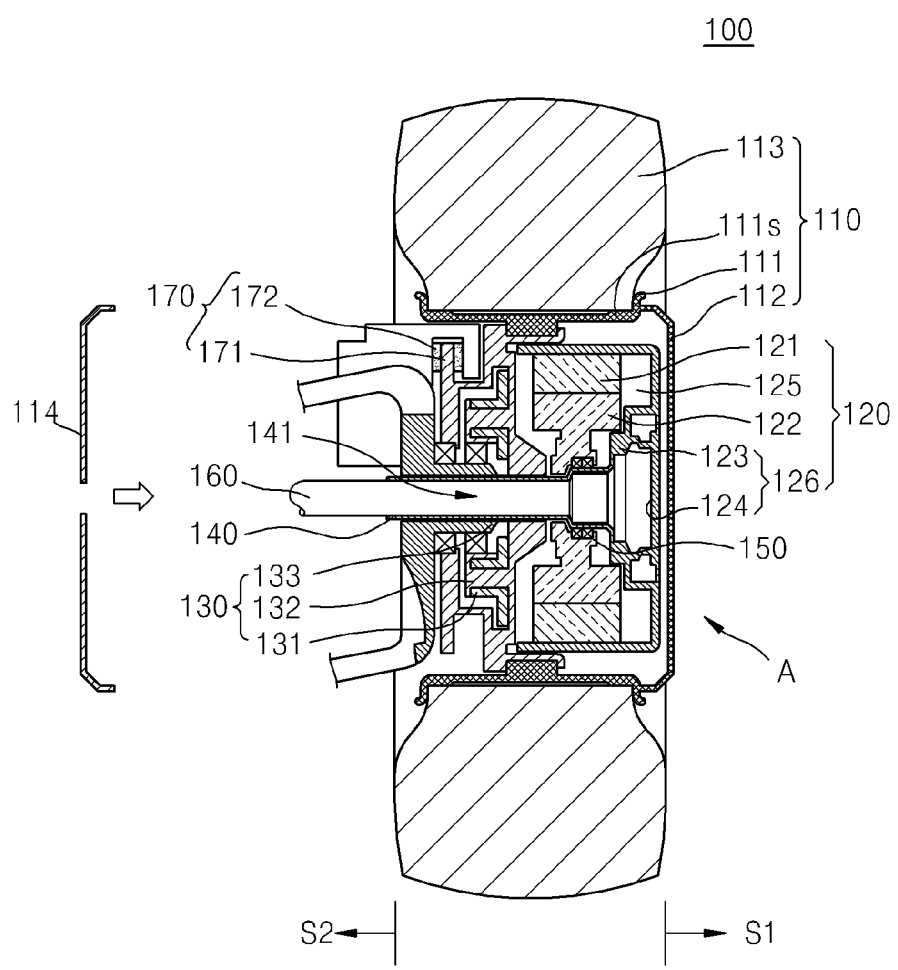
FIG. 2 is a cross-sectional view taken along line II-II of FIG. 1.

FIG. 1 is a perspective view of an in-wheel driving device 100 according to an exemplary embodiment. FIG. 2 is a cross-sectional view taken along line II-II of FIG. 1.

Referring to FIGS. 1 and 2, the in-wheel driving device 100 includes a car wheel 110. The car wheel 110 may have any one of various shapes.

The car wheel 110 may include, for example, a wheel body unit 111 having an inner space A open to both sides S1, S2, and an outer cover 112 detachably provided to the wheel body unit 111 to open or close one of both sides S1, S2 of the wheel body unit 111.

Specifically, the inner space A of the car wheel 110 accommodates a motor 120, a transmission unit 130, and a rigid shaft 140. A tire 113 is provided on an outer tire surface 111S of the car wheel 110. Also, the car wheel 110 may include an inner cover 114. The outer cover 112 and the inner cover 114 are detachably provided to the wheel body unit 111 to open or close the open sides S1, S2 of the wheel body unit 111.

Alternatively, the car wheel 110 may include any structure having an inner space and being capable of opening or closing the inner space. However, for convenience of description, the car wheel 110 including the wheel body unit 111, the outer cover 112, and the inner cover 114 is mainly described.

Meanwhile, the wheel body unit 111, the outer cover 112, and the inner cover 114 may be combined in various ways. For example, the wheel body unit 111 and the outer cover 112 may be tightly fit to each other, and may be combined to each other by using combining members, such as a bolt and a nut. Alternatively, combining protrusions (not shown) may be formed on the outer cover 112 and the inner cover 114, and a combining groove (not shown) may be formed in the wheel body unit 111, and the outer cover 112 and the inner cover 114 are combined to the wheel body unit 111 via the combining protrusions and the combining groove.

The motor 120 is disposed in the car wheel 110 and generates rotation power. The motor 120 may be completely inserted into the wheel body unit 111.

The motor 120 may include a stator 122 and a rotor 121 and may be a general motor. The motor 120 may be a brushless direct current (BLDC) motor. In this case, the stator 122 and the rotor 121 may be a generally used electromagnet or permanent magnet, and thus, details thereof are not described herein.

The motor 120 may include a housing 126 forming an outer appearance of the motor 120. The housing 126 may be connected to the rigid shaft 140 as will be described later.

The housing 126 may include a housing body unit 123 formed by extending from the rigid shaft 140. Also, the housing 126 may be combined and connected to the rigid shaft 140. A space may be formed inside the housing body unit 123 such that the stator 122 is fixed on an inner surface of the housing body unit 123 and the rotor 121 is disposed in the space at a predetermined distance from the stator 122. Specifically, the housing body unit 123 and the rigid shaft 140 may form an "E" shape.

Also, the tire 113 may be provided on an outer surface of the housing body unit 123 at a part of the housing body unit 123 parallel from the rigid shaft 140.

A repair hole 125 may be formed in the outer surface of the housing body unit 123 to penetrate through a part of the housing body unit 123 bending and extending from the rigid shaft 140.

The motor 120 may include a housing cover 124 detachably provided to the housing body unit 123 so as to open or close the repair hole 125. The housing cover 124 may be provided to the housing body unit 123 via any one of various methods. For example, the housing cover 124 may be combined to the housing body unit 123 via a connecting member or a combining protrusion.

Meanwhile, the in-wheel driving device 100 may include the transmission unit 130 disposed inside the car wheel 110. Here, the transmission unit 130 may be disposed to be closer to the car than the motor 120. The transmission unit 130 may rotate the car wheel 110 by receiving rotation power from the rotor 121. The transmission unit 130 may also include an opening 133 where the rigid shaft 140 is inserted into the opening 133 to fix the motor 120 to the car body as will be described later.

Specifically, the transmission unit 130 may receive the rotation power from the rotor 121, modify the rotation speed and torque of the rotor 121 and transmit the modified rotation speed and torque to the car wheel 110. For this purpose, the transmission unit 130 may include one of various apparatuses for modifying and transmitting the rotation speed and torque of the rotor 121.

The transmission unit 130 may reduce the rotation speed of the motor 120, increase the torque of the motor 120 and transmit the reduced rotation speed and increased torque to the car wheel 110. For this purpose, the transmission unit 130 may include a reducer (not shown) for reducing the rotation speed and increasing the torque to be transmitted to the car wheel 110. For convenience of description, the transmission unit 130 including the reducer will be mainly described.

The transmission unit 130 may include a rotating unit 131 connected to the rotor 121 to receive the rotation power of the rotor 121. Also, the transmission unit 130 may include a rotation transmitting unit 132 that rotates by contacting the rotating unit 131 and transmits the rotation movement of the rotating unit 131 to the car wheel 110.

The transmission unit 130 may have any one of various structures. For example, the transmission unit 130 may include a planet gear type decelerator. The planet gear type decelerator may be a general planet gear type decelerator.

In detail, the transmission unit 130 may include a ring gear, a planet gear, a sun gear, and a carrier. The rotating unit 131 may include the sun gear, the carrier, and the planet gear, and the rotation transmitting unit 132 may include the ring gear. Alternatively, the rotating unit 131 may include the sun gear and the ring gear, and the rotation transmitting unit 132 may include the carrier and the planet gear.

However, for convenience of description, the rotation transmitting unit 132 including the carrier and the planet gear will be mainly described.

The structure of the transmission unit 130 is not limited to the above, and the transmission unit 130 may include any apparatus or structure capable of reducing and transmitting the rotation movement of the motor 120. Hereinafter, for convenience of description, the transmission unit 130 including the planet gear type reducer described above will be mainly described.

Meanwhile, the in-wheel driving device 100 includes the rigid shaft 140 having a hollow 141 so as to fix the motor 120 to a car body (not shown). A space may be formed inside the rigid shaft 140, and a cable (not shown) connected to the rotor 121 or the stator 122 to transmit a current or signal may be inserted into the space. Also, the rigid shaft 140 penetrates through the rotor 121 and the stator 122 of the motor 120 and penetrates through the rotating unit 131 and the rotation transmitting unit 132.

The rigid shaft 140 may be connected to the housing body unit 123 via any method. In detail, the rigid shaft 140 and the housing body unit 123 may be separately formed, and the rigid shaft 140 may be connected to the housing body unit 123 via welding or a combining member, such as a bolt.

Alternatively, the rigid shaft 140 may be integrally formed with the housing body unit 123 to be connected to the housing body unit 123. Hereinafter, for convenience of description, it will be considered that the rigid shaft 140 and the housing body unit 123 are integrally formed.

The in-wheel driving device 100 may include a bearing 150 disposed between the rotor 121 and the rigid shaft 140 to rotatably support the rotor 121. The bearing 150 may be a general ball bearing.

The in-wheel driving device 100 may include a spindle 160 disposed in the car wheel 110. The spindle may be attached to a car by penetrating through a part of the housing 126 to fix the housing 126. In detail, the spindle 160 may be fixed to the car, and strongly support the rigid shaft 140 as the spindle 160 is inserted into the rigid shaft 140 as shown in FIG. 2.

Alternatively, the rigid shaft 140 and the spindle 160 may be connected to each other via any one of various methods. For example, the rigid shaft 140 and the spindle 160 may be integrally formed to be connected to each other. Alternatively, the rigid shaft 140 may be inserted into and connected to the spindle 160. In this case, the rigid shaft 140 may be key-combined to the spindle 160, or a rigid shaft 140 having a polygonal shape may be inserted into and combined with the spindle 160.

In an exemplary embodiment, a part of the transmission unit 130 may be inserted into and fixed to the spindle 160. Also, the spindle 160 and the housing 126 may be integrally formed.

The in-wheel driving device 100 may include a brake unit 170 that is connected to the transmission unit 130 and adjusts a rotation speed of the transmission unit 130. The brake unit 170 may include a disk unit 171 rotating by being connected to a part of the transmission unit 130 that rotates. Also, the brake unit 170 may include a pad unit 172 provided in the car to reduce the rotation speed of the disk unit 171 by contacting the disk unit 171 according to a user's selection.

In detail, the disk unit 171 may be connected to the rotation transmitting unit 132 to rotate together with the rotation transmitting unit 132. Also, the pad unit 172 may be spaced apart from the disk unit 171 and contact the disk unit 171 according to a user's selection. In this case, a plurality of the pad units 172 may be disposed to face each other across the disk unit 171. Accordingly, the brake unit 170 may stop the car by stopping the rotation of the car wheel 110.

Alternatively, the transmission unit 130 may include the rotating unit 131 rotating by being connected to a part of the transmission unit 130 that rotates, and the brake unit 170 reducing the rotation speed of the rotating unit 131 by contacting the rotating unit 131 according to a hydraulic pressure supplied according to a user's selection.

In detail, the rotating unit 131 may be connected to the rotation transmitting unit 132 to rotate together with the rotation transmitting unit 132. when a hydraulic pressure is supplied from the outside of the brake unit 170 to the brake unit 170, the brake unit 170 may move towards the rotating unit 131 and contact the rotating unit 131 to stop the rotation of the rotating unit 131.

However, for convenience of description, it will be considered that the brake unit 170 includes the disk unit 171 and the pad unit 172.

Hereinafter, operations and repairing of the in-wheel driving device 100 will be described in detail.

The in-wheel driving device 100 may start operating when the user applies an external signal to the in-wheel driving device 100. In detail, when the user applies a signal, a current may be supplied to the motor 120. The current may be supplied to at least one of the stator 122 and the rotor 121 to rotate the rotor 121.

When the rotor 121 rotates, the rotating unit 131 rotates too. As described above, the transmission unit 130 may reduce and transmit a rotation movement of the rotating unit 131 to the wheel body unit 111. In detail, the rotor 121 may rotate the sun gear and the sun gear may rotate the planet gear and the carrier. The carrier may be connected to the wheel body unit 111 to rotate the wheel body unit 111. Accordingly, the in-wheel driving device 100 may be simply driven to make the car move.

When the user applies a signal to the brake unit 170 as described above, the brake unit 170 may reduce the rotation speed of the rotation transmitting unit 132. In detail, the pad unit 172 contacts and applies a frictional force to the disk unit 171 so as to reduce or stop the rotation of the rotation transmitting unit 132.

Meanwhile, when the motor 120 brakes down, the user may stop the in-wheel driving device 100 from operating in order to repair the motor 120. A method of separating the motor 120 may differ based on a method of providing the motor 120. In detail, when the housing body unit 123 is integrally formed with the rigid shaft 140, the rigid shaft 140 may be separated from the spindle 160 to repair the motor 120. Alternatively, the housing cover 124 combined to the housing body unit 123 may be separated without having to separate the rigid shaft 140 from the spindle 160, and the motor 120 may be repaired through the repair hole 125.

Alternatively, when the motor 120 is combined and connected to the rigid shaft 140, the motor 120 may be separated from the rigid shaft 140 to be repaired. For convenience of description, it will be considered that the housing body unit 123 is integrally formed with the rigid shaft 140 so that the motor 120 is repaired through the repair hole 125.

In detail, the user may separate the outer cover 112 from the wheel body unit 111. The housing cover 124 may be separated from the housing body unit 123. In this case, the repair hole 125 is completely opened, and thus, the rotor 121 and the stator 122 may be accessed from the outside of the in-wheel driving device 100. In addition, since other components in the motor 120 are also accessible, the user may easily repair the motor 120.

Accordingly, in the in-wheel driving device 100, the motor 120 is disposed at the outermost side of the car wheel 110, and thus, operational convenience may be improved as the motor 120 may be repaired without having to disassemble the entire in-wheel driving device 100 when the motor 120 breaks down.

Also, in the in-wheel driving device 100, a space required for the motor 120 and the transmission unit 130 is saved by providing the motor 120 and the transmission unit 130 in the car wheel 110, and thus, the in-wheel driving device 100 has a small volume and a simple structure, thereby reducing a weight of the car. Accordingly, a driving performance of the car may be improved.

While exemplary embodiments have been particularly shown and described above, it will be understood by those of ordinary skill in the art that various changes in form and details may be made therein without departing from the spirit and scope of the present invention as defined by the following claims.

What is claimed is:

1. An in-wheel driving device mounted in a car wheel and comprising:
    a motor comprising:
        a housing;
        a stator; and
        a rotor;
    a transmission unit disposed adjacent to the motor, having an opening therein, and configured to receive rotation power from the rotor and rotate the car wheel; and
    a rigid shaft inserted into the opening to fix the motor to a car body,
    wherein the rigid shaft is connected to the housing,
    wherein the housing comprises:
        a housing body unit extending from the rigid shaft and having a repair hole in an outer surface thereof,
        wherein the stator is fixed on an inner surface of the housing body unit and the rotor is disposed in the housing body unit at a predetermined distance from the stator; and
        a housing cover detachably provided to the housing body unit to open or close the repair hole.

2. The in-wheel driving device of claim 1, wherein the rigid shaft penetrates through the rotor.

3. The in-wheel driving device of claim 1, further comprising a bearing disposed between the rigid shaft and the rotor.

4. The in-wheel driving device of claim 1, wherein the housing is integrally formed with the rigid shaft by extending from the rigid shaft.

5. The in-wheel driving device of claim 1, wherein the rigid shaft has a hollow.

6. The in-wheel driving device of claim 1, wherein the car wheel comprises:
    a wheel body unit comprising:
        an inner space where the transmission unit and the rigid shaft are disposed; and
        an outer surface whereon a tire is provided; and
    an outer cover detachably provided to the wheel body unit to open or close a first side of the wheel body unit.

7. The in-wheel driving device of claim 6, wherein the wheel body unit further comprises an inner cover detachably provided to the wheel body unit to open or close a second side opposite to the first side.

8. The in-wheel driving device of claim 1, further comprising a spindle disposed inside the car wheel,
    wherein the spindle is inserted into the rigid shaft.

9. The in-wheel driving device of claim 8, wherein a part of the transmission unit is fixed to the spindle.

10. The in-wheel driving device of claim 1, wherein the transmission unit comprises:
    a rotating unit connected to the rotor to transmit rotation power of the rotor; and
    a rotation transmitting unit configured to rotate by contacting the rotating unit, and transmit rotation power to the car wheel by reducing a rotation speed of the rotating unit.

11. The in-wheel driving device of claim 1, further comprising a brake unit connected to the transmission unit to adjust a rotation speed of the transmission unit.

12. The in-wheel driving device of claim 11, wherein the brake unit comprises:
    a disk unit configured to rotate by being connected to a part of the transmission unit; and
    a pad unit provided in a car and configured to reduce a rotation speed of the disk unit by contacting the disk unit.

13. The in-wheel driving device of claim 1, wherein the transmission unit comprises:
    a rotating unit configured to rotate by being connected to a part of the transmission unit; and
    a brake unit provided in a car and configured to reduce a rotation speed of the rotating unit by contacting the rotating unit according to a hydraulic pressure.

14. The in-wheel driving device of claim 1, wherein the stator and the rotor are concentric and the stator is provided in inner side of the rotor in a radial direction of the car wheel.

15. The in-wheel driving device of claim 1, wherein a portion of the transmission unit is provided between the motor and a tire in a radial direction of the car wheel.

16. An in-wheel driving device mounted in a car wheel and comprising:
    a motor comprising:
        a housing;
        a stator; and
        a rotor;
    a transmission unit disposed adjacent to the motor, having an opening therein, and configured to receive rotation power from the rotor and rotate the car wheel;
    a rigid shaft inserted into the opening to fix the motor to a car body; and
    a spindle disposed inside the car wheel, the spindle inserted into the rigid shaft,
    wherein the rigid shaft is connected to the housing,
    wherein the stator is provided on an inner surface of the housing,
    wherein the rotor is disposed in the housing at a predetermined distance from the stator, and
    wherein the spindle and the housing are integrally formed.

* * * * *